United States Patent
Auger et al.

[11] Patent Number: 5,980,748
[45] Date of Patent: *Nov. 9, 1999

[54] METHOD FOR THE TREATMENT OF A LIQUID

[75] Inventors: Richard Auger, St-Elzéar; Bernard Drouin, Cap Rouge, both of Canada

[73] Assignee: Texel Inc., Quebec, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/813,034

[22] Filed: Mar. 6, 1997

[30] Foreign Application Priority Data

Mar. 7, 1996 [CA] Canada .................................. 2171279

[51] Int. Cl.$^6$ ................................................... B01D 15/00
[52] U.S. Cl. ........................ 210/631; 210/632; 210/660; 210/679; 210/694; 210/274; 210/283
[58] Field of Search .................................... 210/274, 283, 210/284, 617, 631, 656, 660, 679, 694, 662, 668, 632; 422/191, 193

[56] References Cited

U.S. PATENT DOCUMENTS

| | | | |
|---|---|---|---|
| 3,466,151 | 9/1969 | Sicard et al. | 422/191 |
| 3,506,408 | 4/1970 | Kageyama et al. | 210/284 |
| 3,880,596 | 4/1975 | Liebert et al. | 422/191 |
| 4,199,607 | 4/1980 | Sherman et al. | 426/477 |
| 4,293,315 | 10/1981 | Sederquist | 422/191 |
| 4,604,261 | 8/1986 | Chen et al. | 422/191 |

FOREIGN PATENT DOCUMENTS

| | | |
|---|---|---|
| 2550818 | of 1977 | Germany . |
| 4022552 | of 1992 | Germany . |
| WO95/21691 | 8/1995 | WIPO . |

*Primary Examiner*—Ivars Cintins
*Attorney, Agent, or Firm*—Bacon & Thomas

[57] ABSTRACT

A method for the treatment of a liquid in a reactor comprising a chamber having an upper portion and a lower portion, a liquid inlet located in the upper portion of the chamber, a liquid outlet located in the lower portion of the chamber and an absorbent bed within the chamber between the upper and lower portions thereof, said method comprising using as said absorbent bed a porous packing that is able to absorb by capillarity the liquid to be treated, said porous packing having a given capillarity height $h_s$ which is the height that the liquid to be treated reaches by capillarity action when it is fed in a column filled up with a continuous layer of said porous packing; mounting at least one horizontally extending separation member within the chamber so as to divide the absorbent bed into at least two superimposed layers of a given height that is equal to or lower than $h_s$, said at least one separation member being selected so as to be permeable to the liquid to be treated and to cause at least one break in capillarity within the chamber; injecting at regular interval a given volume of said liquid to be treated within said chamber through said liquid inlet; and removing the treated liquid from the said chamber through said liquid outlet.

20 Claims, 4 Drawing Sheets

METHOD FOR THE TREATMENT OF A LIQUID

FIELD OF THE INVENTION

The present invention relates to a method for the treatment of a liquid within a reactor.

DESCRIPTION OF THE PRIOR ART

By "reactor", there is meant a device including chamber in which a reaction between different elements is carried out. In this manner, useful substances are created or noxious substances are destroyed, thereby losing their noxious character.

Numerous industrial processes make use of reactors. For example, reactors are used in the petrochemical, pharmaceutical and food industries.

There are various types of reactors. However, most of the reactors can be divided out in two basic categories, including, on the one hand, those called "batch reactors" and, on the other hand, those called "continuous reactors".

The selection of a reactor is usually made as a function of the volume to be treated, the reaction kinetics, the nature of the reactives and reaction conditions.

For a batch reactor, one of the important characteristics is the average time of residence. In use, a given volume of the liquid to be treated is introduced into the reactor and treated therein for a given period of time. During the treatment, this volume can react with a reactive and/or catalyst. The time of residence is usually equal to the time of treatment, i.e the time during which the liquid may react with the reactive and/or catalyst. Such a time is calculated as a function of the desired result. When the expected result is achieved, the treated liquid is removed from the reactor to give room to another volume of liquid to be treated.

In a batch reactor, different parameters can be adjusted to achieve the requested treatment. Among these parameters, the time of treatment of the liquid within the reactor is the one that is the easiest to control. Usually, the liquid to be treated in the batch reactor is maintained in contact with a resin or a reactive by means of stirring, bubbling or aeration step which permits to keep the resin or reactive uniformly in suspension within the liquid.

The batch reactors are usually provided with an outlet valve that can be opened to remove the liquid after treatment. Presently, to the Applicant's knowledge, there is no reactor using capillarity as a means for retaining the liquid within the porous packing.

OBJECT AND SUMMARY OF THE INVENTION

The object of the present invention is to provide a method for the treatment of a liquid, using a reactor of particular structure.

The reactor according to the invention comprises a chamber, a liquid inlet, a liquid outlet, an absorbent bed and at least one separation member.

The chamber is provided with an upper portion and a lower portion.

The inlet is located in the upper portion of the chamber for introducing at regular intervals a given volume of the liquid to be treated within the chamber. The outlet is located in the lower portion of the chamber for removing therefrom the treated liquid.

The absorbent bed is mounted within the chamber between the upper and lower portions thereof. This bed consists of a porous packing capable of absorbing by capillarity and thus retain the liquid introduced within the chamber for treatment purposes. The porous packing can be reactive or non-reactive.

Each separation member extends horizontally within the chamber and divides the absorbent bed into at least two superimposed layers of a given height. This height is calculated as a function of the height of the liquid to be treated which is reached by capillarity action when it is filled in a column filled up with a continuous layer of the same absorbent bed. Each separation member is made of a material that is selected be permeable to the liquid to be treated but also to cause at least one break in capillarity within the chamber.

The time of residence and/or treatment within the reactor according to the invention can be as long as wanted and easily controllable. Indeed, it corresponds to the time spent between two successive introductions of liquid within the chamber.

Thus, the invention provides a method for the treatment of a liquid in a reactor comprising a chamber having an upper portion and a lower portion, a liquid inlet located in the upper portion of the chamber, a liquid outlet located in the lower portion of the chamber and an absorbent bed within the chamber between the upper and lower portions thereof, said method comprising:

using as said absorbent bed a porous packing that is able to absorb by capillarity the liquid to be treated, said porous packing having a given capillarity height $h_s$ which is the height that the liquid to be treated reaches by capillarity action when it is fed in a column filled up with a continuous layer of said porous packing;

mounting at least one horizontally extending separation member within the chamber so as to divide the absorbent bed into at least two superimposed layers of a given height that is equal to or lower than $h_s$, said at least one separation member being selected so as to be permeable to the liquid to be treated and to cause at least one break in capillarity within the chamber;

injecting at regular interval a given volume of said liquid to be treated within said chamber through said liquid inlet; and removing the treated liquid from the said chamber through said liquid outlet.

The reactor according to the invention makes use of the capillarity of the absorbent material to control the time of treatment of the liquid to be treated. The liquid fed into the chamber remains within the same as long as another batch of liquid is not introduced. Thus, if the time interval between two successive introductions of liquid is long enough as compared to the time of filling of the reactor, the latter will operate as a batch reactor. However, if the time between two successive introductions of liquid is short, the reactor will then operate as a continuous reactor.

Thanks to the separators dividing the absorbent bed, the reactor can be used with a maximum efficiency. Indeed, the separators limit the height of each bed layer to the maximum height at which the absorbent bed may retain by capillarity the liquid, thereby eliminating any dead space within the chamber. In the case where several separators are used for dividing the absorbent bed in layers, these layers can be filled up successively. In such a case, the reactor according to the invention operates as a plurality of batch reactors operating in sequence.

In order to maximize the reactor yield for a given treatment, several types of porous packing can be used. The porous packing can be reactive or not, and be separated into two or more layers by one or more separation members.

For specific treatments, bacteria, catalysts, enzymes or antibodies can be attached or grafted to the packing, in order to make it reactive. When the reaction speed is known to be slow, the reactor according to the invention can be adapted so as to adjust the time of residence of the liquid therein and thus achieve the requested treatment.

The reactor used in the method according to the invention is not expensive to manufacture and use. Therefore, it is particularly advantageous when the reactor construction costs must be minimized.

In view of the prior art known to the Applicant, it was not obvious to use a reactor operating by capillarity, because any treatment carried out by capillarity is known to give very low yield. The separation members used in the reactor according to the invention permit to increase this yield and thereby make the reactor as efficient as any other.

BRIEF DESCRIPTION OF THE DRAWINGS

The invention will be better understood upon reading the following non restrictive description of a preferred embodiment thereof, made with reference to the accompanying drawings in which.

For the sake of simplicity, the same reference numerals have been used to identify the same structural elements in the following description and appended drawings.

DESCRIPTION OF A PREFERRED EMBODIMENT OF THE INVENTION

Figure 1:
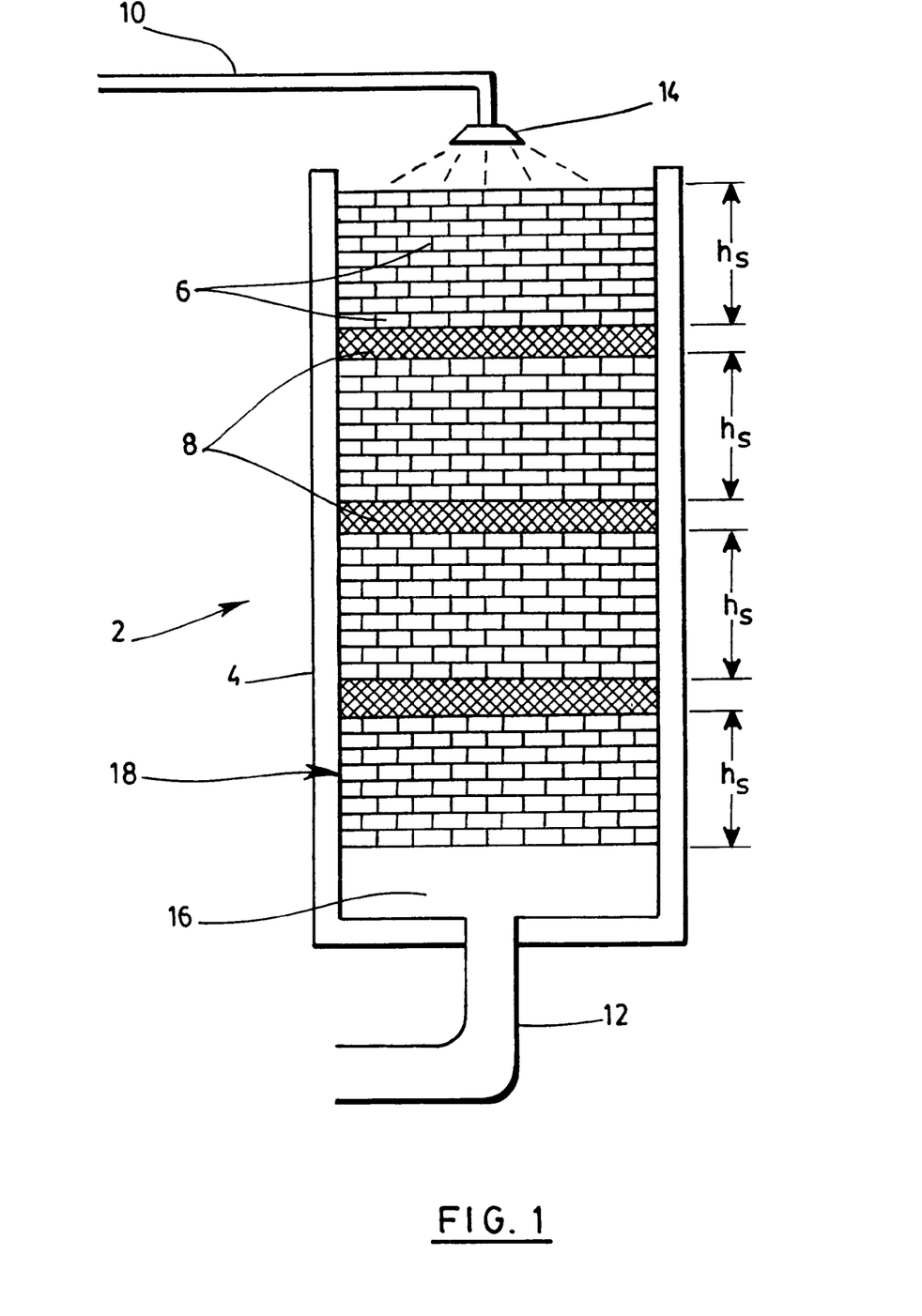
FIG. 1 is a schematic representation of a reactor according to a preferred embodiment of the invention.

A reactor for use in the method (2) according to the invention is shown in FIG. 1. This reactor (2) comprises a chamber (4) having an upper portion and a lower portion, an inlet (10), an outlet (12) and an absorbing bed (6) divided out in four layers by means of three separators (8).

The inlet (10) is located in the upper portion of the chamber (4). This inlet is used for introducing at regular interval a given volume of the liquid to be treated. The inlet (10) is provided with a distribution nozzle (14) for uniformly distributing the liquid to be treated in the upper portion of the chamber. The outlet (12) is located in the lower portion of the chamber (4). It is used for removing the liquid treated from the reactor.

The three separators (8) preferably consist of grids that can be made of plastic material, metal or resin, especially polyvinyl chloride (PVC). Each grid is in the form of a mesh provided with openings small enough to create a hydraulic contact break and, accordingly, the requested break in capillarity. The separators divide the absorbing bed into four superimposed layers (18) of the same height $h_s$. The absorbing bed consists of a porous packing. The bed can be "homogeneous", which means that the porous packing consists of a single piece. Alternatively, the bed can be "heterogeneous", when the porous packing consists of several pieces. It is worth mentioning that when the packing is heterogeneous, the capillarity is not only achieved in the vertical axis, but also in all other directions. In such a case, the liquid that is introduced into the chamber can move from one piece to the other within the chamber, without dripping between the pieces. Thus, it is possible to introduce by another inlet preferably also located in the upper portion of the chamber, a gas such as air, and to have this gas circulated within the chamber in an independent manner between the packing pieces.

The porous packing can be reactive and be coupled to a catalyst, proteins, micro-organisms such like bacteria or a reactive that may react with at least one of the component of the solution of the liquid to be treated. Preferably, the reactive porous packing may consist of metallic fibers covered by a catalyst like nickel or platinum, activated carbon, zeolites, non-woven fabrics having bacteria attached to their fibers, polyacrylamide or alginate gels containing enzymes or antibodies, and natural or synthetic fibers having antibodies grafted to them.

Alternatively, the porous packing can be non-reactive. In such a case, this packing preferably consists of polyurethane foams, polypropylene foams, glass fibers, peat moss, volcanic stone, paper, porous ceramics, natural or synthetic fibers or synthetic non-woven fabrics.

In the preferred embodiment shown in FIG. 1, the reactor (2) also comprises a decantation pan (16). It is worth mentioning that the decantation pan (16) as well as the distribution nozzle (14) mentioned hereinabove are only preferred embodiments of the invention. Both of them are not essential to a proper preparation of the reactor (2).

Figure 2:
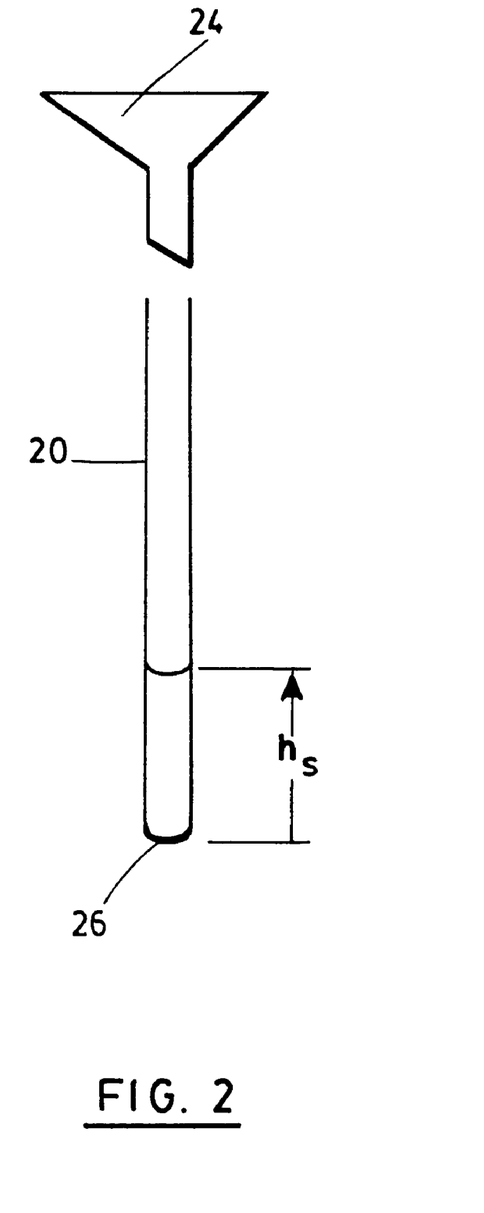
FIG. 2 is a schematic representation of a column filled up with a packing bed retaining a liquid by capillarity over a height $h_s$.
Figure 3:
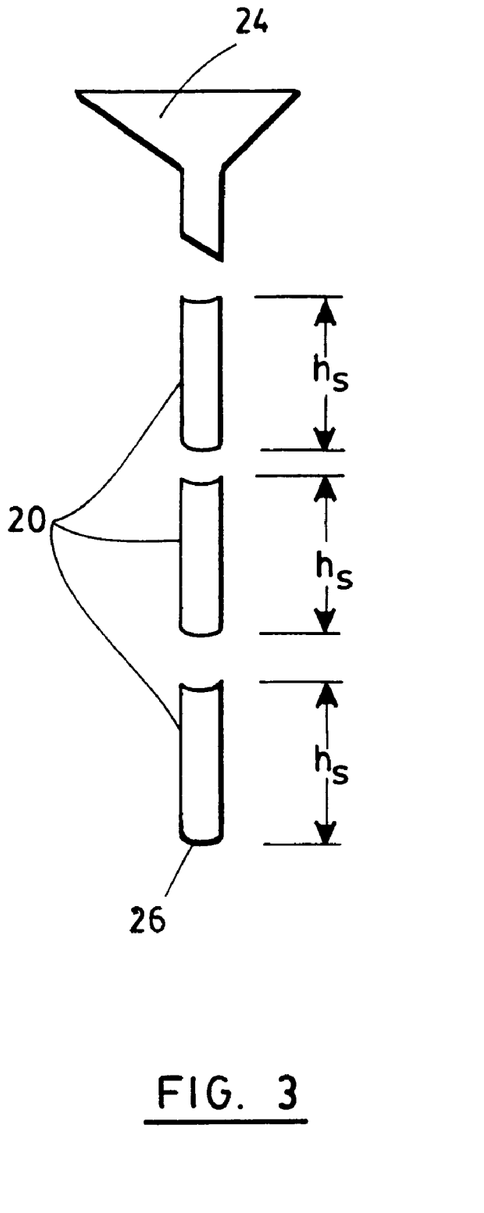
FIG. 3 is a view similar to the one of FIG. 2, showing the result obtained with a break in capillarity.

FIGS. 2 and 3 illustrate the capillarity effect and the influence of the separators onto the capillarity. In FIG. 2, a capillarity column consisting of a glass tube (20) of 1 mm diameter comprising an upper end (24) and lower end (26) is filled up with a liquid, like water. In order to determine the height $h_s$ at which the liquid is retained by capillarity, an excess amount of liquid is introduced into the upper end (24) of the tube. After the excess of liquid has flowed down, a given amount of liquid is retained within the tube. The distance between the upper and lower ends of this liquid column is the capillarity height $h_s$. The volume of the liquid retained in the column is hereinafter called $V_r$.

The liquid does not completely fill up the capillarity tube if the height of the tube (20) is higher than $h_s$. As a matter of fact, as is shown in FIG. 2, only a portion of the tube corresponding to the height $h_s$ is used. FIG. 3 illustrates three capillary tubes (20) of the same height $h_s$, that are superimposed in discontinued manner. To do so and use the capillarity action of each tube, a break in capillarity must be achieved. This break in capillarity is obtained by segmentation. In the reactor according to the invention, the break in capillarity is achieved by the separators.

The separation of the absorbent bed, like the segmentation of the capillarity tube, permits to the capillarity force to supersede the gravitational force which is exerted onto the water column which is smaller in height since it is segmented. In this manner, all the absorbent bed of the column is used, whereas, when no separator is used, only the lower portion of the column is actually used.

Figure 4:
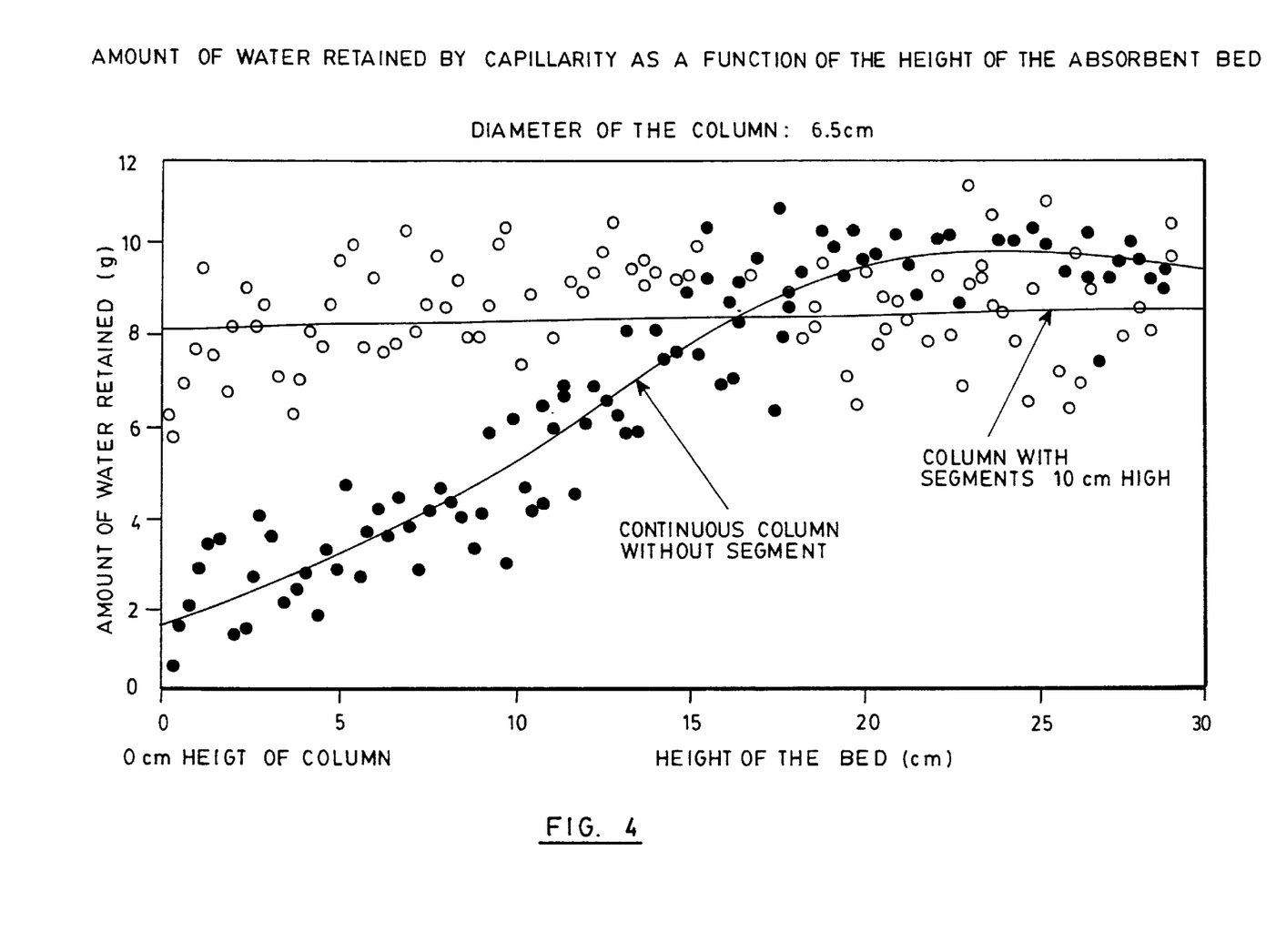
FIG. 4 is a curve illustrating the distribution of the water mass held by capillarity within a continuous column and a segmented column.

The curve shown in FIG. 4 illustrates the distributions of the water mass retained by capillarity as a function of the height of the bed in the case of a continuous column and in the case of a segmented column, both columns being otherwise similar. On this curve, the height of the bed is reported in abscisse and calculated as a function of the height of the column.

In view of FIG. 4, it is obvious that for the column segmented in two portions of 10 cm high, the distribution of the mass of liquid retained within the column is constant over the full length thereof, such being achieved because the height of the segment of the column does not exceed the height $h_s$.

In the case of the continuous column, the lower portion of the column contains a maximum amount of liquid whereas the upper portion of the column does not retain any liquid or much less.

The reactor (2) shown in FIG. 5 was built up with the various specific dimensions and capacity reported in the example given hereinafter. The liquid to be treated was brought to the inlet (10) of the reactor and distributed therein by a distribution nozzle (14). The liquid passed through separators (8) and impregnated and saturated a porous packing acting as an absorbent bed (6). The reactor comprised three dead spaces (30) separating the absorbing bed (6) into three layers. The dead spaces (30) were there because the chamber (4) of the reactor (2) that was used for the experiment was not specifically devised for this purpose but actually corresponded to the one of a conventional reactor. Under each layer of porous packing (6), the reactor comprised a sampling valve (42) which permitted to pick up samples of the liquid in order to evaluate the treatment. After having been treated, the liquid was removed from the chamber by an outlet which was provided with a draining valve (32). Once again, it is worth mentioning that this draining valve is only optional, since in the reactor according to the invention, the capillarity permits to retain in a passive manner the liquid to be treated.

Figure 5:
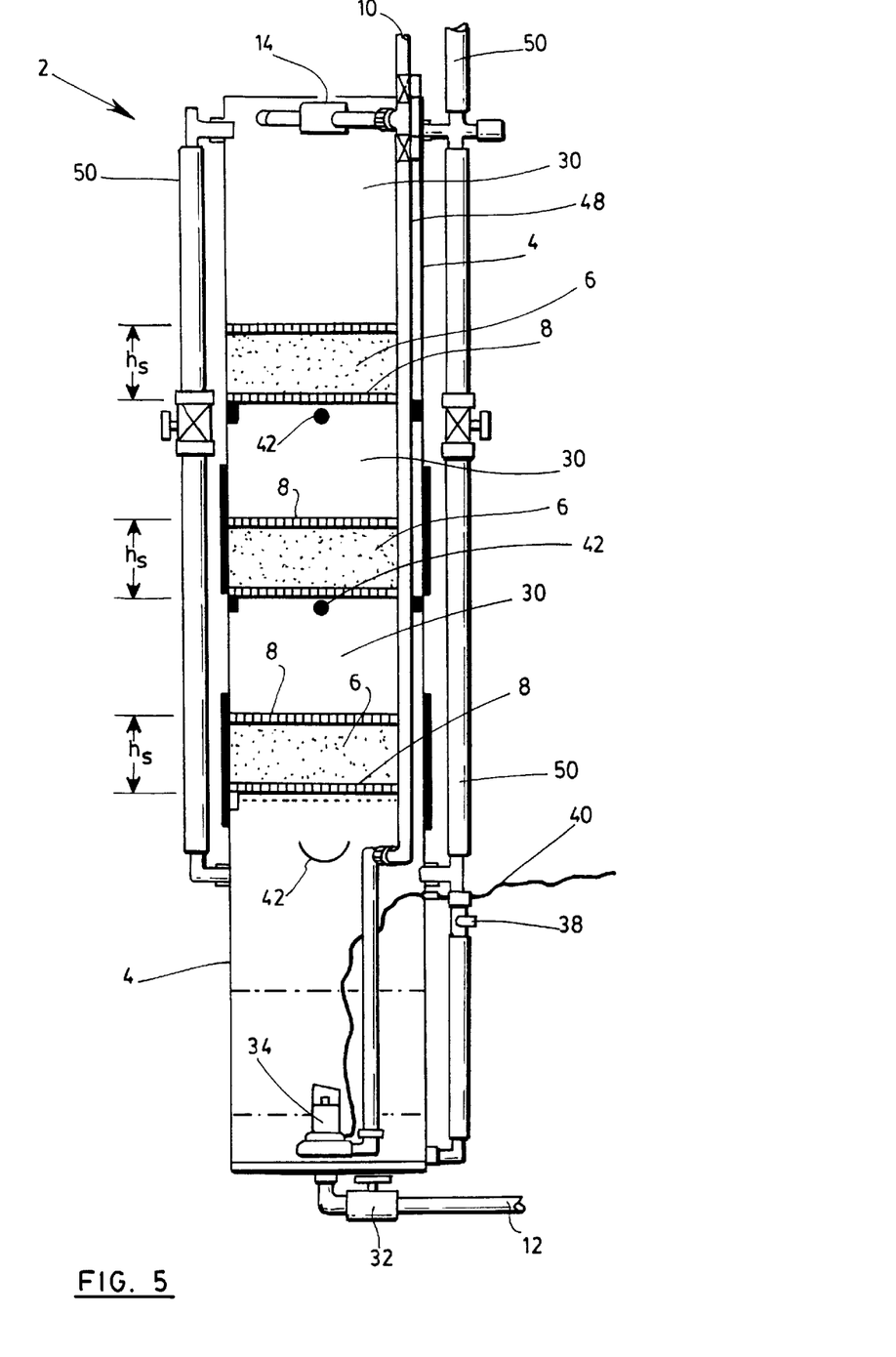
FIG. 5 is a schematic representation of a reactor according to the invention that was used for comparison purposes with a conventional batch reactor.

The reactor shown in FIG. 5 also comprised a ventilation system (50) provided with an overflow pipe (38), a recirculation pump (34) operated by an electric bowler (40) which was preferably connected to a timer, and a back flow conduct (48).

In practice, the reactor according to the invention as shown in FIG. 5 was built up as a function of a plurality of requested physical characteristics, such as a given volume D of liquid to be treated, the residence time $t_{res}$ to required to obtain the requested treatment, the time $t_{inj}$ necessary for loading the reactor, the surface S of this reactor or the height $h_s$ reached by the liquid due to the capillarity action within a given kind of packing, the density $d_1$ of the liquid to be treated and the ratio R of the mass of the absorbent bed saturated with the liquid to be treated to the mass of the same bed in dry form. The ratio R is a characteristic that is specific to the porous packing used as absorbent bed. Such a ratio can be measured on a sample of absorbent bed of a height lower than $h_s$, having an apparent dry density $d_{app}$.

As previously indicated, each absorbent bed has its own characteristics ($d_{app}$, R and $h_s$). If these characteristics are not known, it is possible to determine them experimentally.

To determine R, one can, in a column identical to the one shown in FIG. 2, determine the mass of the dry bed $m_o$ occupying a height $h_i$ much lower than the presumed height $h_s$. After saturation with the liquid to be treated, the mass $m_l$ of the same bed can be measured. Thus, one can determine the ratio R according to the equation:

$$R = m_l/m_o \tag{1}$$

wherein $m_l$ and $m_o$ are defined as above.

The density $d_{app}$ can be calculated from the mass of the dry bed and its volume, according to the equation:

$$d_{app} = \frac{m_o}{s \cdot h_i} \tag{2}$$

wherein s is the surface of the column that is used for the experimentation and $h_i$, $m_o$ and $d_{app}$ are defined as above.

The height $h_s$ is determined according to the equation:

$$h_s = \frac{\frac{m_1}{s \cdot d_{app}} - h_i}{(R-1)} \tag{3}$$

wherein $h_s$, $m_l$, s, $d_{app}$, R and $h_i$ are defined as above. It is worth mentioning that the values of R, $d_{app}$ and $h_s$ are specific to the absorbent bed and accordingly independent from the kind of reactor that is being used.

The number of injection $n_{inj}$ during a given period of treatment $t_d$ of a volume D is calculated according to the equation:

$$n_{inj} = \frac{t_d}{(t_{res} + t_{inj})} \tag{4}$$

wherein $n_{inj}$, $t_d$, $t_{res}$ and $t_{inj}$ are defined as above.

The volume $V_r$ of liquid to be treated contained within the reactor is calculated according to the equation:

$$V_r = D/n_{inj} \tag{5}$$

wherein $V_r$, D and $n_{inj}$ are defined as above.

When one knows the volume $V_r$ of liquid contained in the reactor, the volume V of the absorbent bed necessary to absorb the volume $V_r$ of liquid to be treated can be calculated by the following equation:

$$V = \frac{V_r \cdot d_1}{(R-1) \cdot d_{app}} \tag{6}$$

wherein $d_l$ is the density of the liquid to be treated, and V, $V_r$, R and $d_{app}$ are defined as above.

The mass M of the absorbent bed necessary for a proper operation of the reactor can be calculated by the following equation:

$$M = V \cdot d_{app} \tag{7}$$

wherein M, V and $d_{app}$ are defined as above.

Depending on whether the surface S or the height $h_t$ of the reactor is known, the other one of these two parameters can be calculated by the following equation:

$$s = V/h_t \tag{8}$$

or $$h_t = V/S \tag{9}$$

wherein S, V and $h_t$ are defined as above.

Last of all, the number $n_s$ of separators required within the reactor can be calculated according to the equation:

$$n_s = \frac{h_t}{h_s} - 1 \qquad (10)$$

wherein $n_s$, $h_t$ and $h_s$ are defined as above and the number $n_s$ is rounded to the immediate upper figure.

EXAMPLE

The reactor shown in FIG. 5 was built up and used for treating domestic waste water. This reactor had the following characteristics:

| | |
|---|---|
| volume D of waste water to be treated: | 0.627 m³; |
| residence time $t_{res}$: | 28 minutes |
| time $t_{inj}$ necessary for introducing the liquid within the reactor: | 0 minute (negligible); |
| height $h_t$ of the absorbent bed: | 0.3 meter; |
| treatment time $t_d$ of the volume D: | 1440 minutes (24 hours); |
| density $d_1$ of the waste water: | 1000 kg/m³; |
| porous packing: | chips of non-woven polyester fabric of 2.5 × 2.5 × 6 mm, saturated with an acrylic resin; |
| height $h_c$ reached by the waste water by capillarity action: | 0.112 meter; |
| ratio R (mass of the saturated bed to mass of the dry bed): | 4.52; |
| density $d_{app}$ of the dry bed: | 150 kg/m³; |

By using the values given hereinabove with equations 4 to 8 and 10 given hereinabove, one may obtain:

$$n_{inj} = \frac{t_d}{(t_{res} + t_{inj})} = \frac{1440}{(28+0)} = 52 \qquad (4')$$

$$V_{n'} = \frac{D}{n_{inj}} = \frac{0,627}{52} = 0,012 m^3 \qquad (5')$$

$$V = \frac{V_r \cdot d_1}{(R-1) \cdot d_{app}} = \frac{0,012 \cdot 1000}{(4,52-1) \cdot 150} = 0,23 m^3 \qquad (6')$$

$$M = V \cdot d_{app} = 0,023 \cdot 150 = 2,45 kg \qquad (7')$$

$$S = \frac{V}{h_t} = \frac{0,023}{0,3} = 0,077 m^2 \qquad (8')$$

$$n_s = \frac{h_t}{h_s} - 1 = \frac{0,3}{0,112} - 1 \cong 2 \qquad (10')$$

Therefore, the reactor that was built up had an absorbing bed volume equal to 0.023 m³ making it possible for it to retain 0.012 m³ of wastewater, and a surface of 0.077 m². It comprised 2 separators dividing the absorbing bed into three layers of 0.1 meter each for a total height equal to about 0.3 meter, keeping in mind that the height of the separators was negligible.

The domestic waste water was treated for 28 minutes within the reactor. Thus, in order to operate non-stop during 24 hours a day, the reactor was filled up 52 times a day (considering that the loading time of the reactor is negligible, viz. $t_{inj}$=0 minute).

The following table shows the result of comparative dosages of different parameters directly related to the purity of the waste water. For comparison purpose, a conventional reactor having a packing of a volume three times bigger than the one of the reactor according to the invention, was used. The surfaces of both reactors were identical (the conventional percolation reactor used for comparative purpose, and the reactor according to the invention). As aforesaid, the reactor according to the invention comprised an absorbent bed divided into three layers (or levels). A measurement was made under each layer, level 3 being the outlet of the reactor.

| Parameters | Septic tank Effluent | Conventional percolation reactor 200 L/m²/day Effluent | Reactor according to the invention as shown in figure 5 1800 L/m²/day | | |
|---|---|---|---|---|---|
| | | | Level 1 | Level 2 | Level 3 |
| $DBO_5$ | 110 | <5 | 6 | 5 | <5 |
| $DBO_5$-sol | — | — | <5 | <5 | <5 |
| DCO | 245 | 23 | 238 | 39 | 34 |
| MES | 35 | 3 | 5 | 5 | <2 |
| NTK | 27.9 | <0.5 | 37.2 | 24.3 | 14.4 |
| $NO_2$—$NO_3$ | 0.86 | 50.6 | 0.64 | 13.3 | 19.6 |
| Fecal content | 29000 | 290 | 6900 | 1500 | 360 |

It is worth noting that the filtrage efficiency of every level of the reactor used for carrying out the method according to the invention is evidenced by the substantial reduction in the amount of fecal content.

It is also worth noting that there is no substantial difference between the results obtained with the conventional percolation reactor and those obtained at the outlet of the reactor according to the invention, except for some nitrogen—containing compounds of secondary importance (NTK). In both cases, the quality of the waste water treatment was excellent.

In order to better appreciate the efficiency of the method according to the invention, measurements were also made on the effluent of a septic tank. As can be seen, the reactor according to the invention is much more efficient than a conventional septic tank.

The superiority of the reactor used for carrying out the method according to the invention lies in particular in the amount of waste water that the reactor can treat per day, and the amount of absorbent bed required to perform a given treatment. The conventional percolation reactor that was used in the above-mentioned test could treat 200 liters per square meter of filtration surface per day, with an absorbing bed volume of 0.07 m³. The reactor according to the invention as shown in FIG. 5, could treat 1800 liters per square meter of filtration surface per day with an absorbing bed volume of 0.023 m³. Therefore, it is obvious that the reactor according to the invention can treat up to 9 times more waste water than a conventional reactor having a volume three times bigger. In other words, the reactor used for carrying out the method according to the invention is approximatively 27 times more efficient than a conventional percolation reactor. In order to achieve the same outflow in a percolation reactor, such reactor should be much bigger and therefore much more expensive.

It is worth mentioning that numerous modifications could be made to the present invention without departing from the scope of the same as defined in the appended claims.

We claim:

1. A method for the treatment of a liquid in a reactor comprising a chamber having an upper portion and a lower portion, a liquid inlet located in the upper portion of the chamber, a liquid outlet located in the lower portion of the chamber and an absorbent bed within the chamber between the upper and lower portions thereof, said method comprising:

injecting in successive batches a given volume of said liquid to be treated in said chamber through said liquid inlet whereby said liquid is absorbed in said absorbent and is treated therein; and then removing the treated liquid from said chamber through said outlet; with the provisos that:

said absorbent bed is a porous packing that is able to absorb by capillarity the liquid to be treated, said porous packing having a given capillarity height $h_s$ which is the height that the liquid to be treated reaches by capillarity action when it is fed in a column filled up with a continuous layer of said porous packing;

at least one horizontally extending separation member is mounted within the chamber so as to divide the absorbent bed into at least two superimposed layers of a given height that is equal to or lower than $h_s$, said at least one separation member being selected so as to be permeable to the liquid to be treated and to cause at least one break in capillarity within the chamber.

2. The method according to claim 1, wherein said at least one separation member consists of a grid having mesh openings of a size that is sufficiently small to create a hydraulic contact break and, accordingly, the break in capillarity.

3. The method according to claim 1, wherein the porous packing of the absorbent bed is non-reactive and selected from the group consisting of polyurethane foams, polypropylene foams, glass fibers, peat moss, volcanic stone, paper, porous ceramics, natural and synthetic fibers and synthetic non-woven fabrics.

4. The method according to claim 3, wherein said at least one separation member consists of a grid having mesh openings of a size that is sufficiently small to create a hydraulic contact break and accordingly, the break in capillarity.

5. The method according to claim 3, wherein the liquid to be treated is injected in a number $n_{inj}$ of batches, the liquid contained within the chamber has a volume $V_r$, the absorbent bed has a volume V and a mass M, the reactor has a surface S and there are a number $n_s$ of separation members, and wherein said method further comprises selecting said $n_{inj}$, $V_r$, V, M, S and $n_s$ as a function of the volume D of the liquid to be treated during a treatment period $t_d$, the time of residence $t_{res}$ required to obtain the requested treatment, the time of loading of the reactor $t_{inj}$, the height $h_s$ reached by the liquid by capillary action in the column, the height $h_t$ of the absorbent bed in the reactor and the ratio R of the mass of the absorbent bed saturated with the liquid to be treated to the mass of the same bed in dry form, said dry bed having an apparent density $d_{app}$, by using the following equations:

$$n_{inj} = \frac{t_d}{(t_{res} + t_{inj})} \quad (4)$$

in which $n_{inj}$, $t_d$, $t_{res}$ and $t_{inj}$ are defined as above;

$$V_r = D/n_{inj} \quad (5)$$

in which $V_r$, D and $n_{inj}$ are defined as above;

$$V = \frac{V_r \cdot d_1}{(R-1) \cdot d_{app}} \quad (6)$$

in which $d_1$ is the density of the liquid to be treated, V, $V_r$, R and $d_{app}$ are defined as above;

$$M = V \cdot d_{app} \quad (7)$$

in which M, V and $d_{app}$ are defined as above;

$$S = V/h_t \quad (8)$$

in which S, V and $h_t$ are defined as above;

$$n_s = \frac{h_t}{h_s} - 1 \quad (10)$$

in which $n_s$, $h_t$ and $h_s$ are defined as above and wherein the number $n_s$ is rounded to the immediate upper integer.

6. The method according to claim 5, further comprising introducing air through at least one other inlet in the upper portion of the chamber.

7. The method according to claim 3, wherein the liquid to be treated is injected in a number $n_{inj}$ of batches, the liquid contained within the chamber has a volume $V_r$, the absorbent bed has a volume V and a mass M, the absorbent bed in the reactor has a height $h_t$ and there are a number $n_s$ of separation members and wherein said method further comprises selecting said $n_{inj}$, $V_r$, V, M, $h_t$ and $n_s$ as a function of the volume D of liquid to be treated during a treatment period $t_d$, the time of residence $t_{res}$ required to obtain the requested treatment, the time of loading of the reactor $t_{inj}$, the height $h_s$ reached by the liquid by capillary action in the column, the surface S of the reactor and the ratio R of the mass of the absorbent bed saturated with the liquid to be treated to the mass of the same bed in dry form, said dry bed having an apparent density $d_{app}$, by using the following equations:

$$n_{inj} = \frac{t_d}{(t_{res} + t_{inj})} \quad (4)$$

in which $n_{inj}$, $t_d$, $t_{res}$ and $t_{inj}$ are defined as above;

$$V_r = D/n_{inj} \quad (5)$$

in which $V_r$, D and $n_{inj}$ are defined as above;

$$n_s = \frac{h_t}{h_s} - 1 \quad (10)$$

in which $d_1$ is the density of the liquid to be treated, V, $V_r$, R and $d_{app}$ are defined as above;

$$M = V \cdot d_{app} \quad (7)$$

in which M, V and $d_{app}$ are defined as above;

$$h_t = V/S \quad (9)$$

in which S, V and $h_t$ are defined as above;

$$n_s = \frac{h_t}{h_s} - 1 \quad (10)$$

in which $n_s$, $h_t$ and $h_s$ are defined as above and wherein the number $n_s$ is rounded to the immediate upper integer.

8. The method according to claim 7, further comprising introducing air through at least one other inlet in the upper portion of the chamber.

9. The method according to claim 3, further comprising introducing air through at least one other inlet in the upper portion of the chamber.

10. The method according to claim 1, wherein the porous packing of the absorbent bed is reactive and selected from the group consisting of metallic fibers covered by a catalyst, activated carbon, zeolites, non-woven fabrics having bacteria attached to their fibers, polyacrylamide or alginate gels containing enzymes or antibodies, and natural or synthetic fibers having antibodies grafted thereto.

11. The method according to claim 10, wherein said at least one separation member consists of a grid having mesh openings of a size that is sufficiently small to create a hydraulic contact break and accordingly, the break in capillarity.

12. The method according to claim 10, wherein the liquid to be treated is injected in a number $n_{inj}$ batches, the liquid contained within the chamber has a volume $V_r$, the absorbent bed has a volume V and a mass M, the reactor has a surface S and there are a number $n_s$ of separation members, and wherein said method further comprises selecting said $n_{inj}$, $V_r$, V, M, S and $n_s$ as a function of the volume D of the liquid to be treated during a treatment period $t_d$, the time of residence $t_{res}$ required to obtain the requested treatment, the time of loading of the reactor $t_{inj}$, the height $h_s$ reached by the liquid by capillary action in the column, the height $h_t$ of the absorbent bed in the reactor and the ratio R of the mass of the absorbent bed saturated with the liquid to be treated to the mass of the same bed in dry form, said dry bed having an apparent density $d_{app}$, by using the following equations:

$$n_{inj} = \frac{t_d}{(t_{res} + t_{inj})} \quad (4)$$

in which $n_{inj}$, $t_d$, $t_{res}$ and $t_{inj}$ are defined as above;

$$V_r = D/n_{inj} \quad (5)$$

in which $V_r$, D and $n_{inj}$ are defined as above;

$$V = \frac{V_r \cdot d_1}{(R-1) \cdot d_{app}} \quad (6)$$

in which $d_1$ is the density of the liquid to be treated, V, $V_r$, R and $d_{app}$ are defined as above;

$$M = V \cdot d_{app} \quad (7)$$

in which M, V and $d_{app}$ are defined as above;

$$S = V/h_t \quad (8)$$

in which S, V and $h_t$ are defined as above;

$$n_s = \frac{h_t}{h_s} - 1 \quad (10)$$

in which $n_s$, $h_t$ and $h_s$ are defined as above and wherein the number $n_s$ is rounded to the immediate upper integer.

13. The method according to claim 12, further comprising introducing air through at least one other inlet in the upper portion of the chamber.

14. The method according to claim 10, wherein the liquid to be treated is injected in a number $n_{inj}$ of batches, the liquid contained within the chamber has a volume $V_r$, the absorbent bed has a volume V and a mass M, the absorbent bed in the reactor has a height $h_t$ and there are a number $n_s$ of separation members and wherein said method further comprises selecting said $n_{inj}$, $V_r$, M, $h_t$ and $n_s$ as a function of the volume D of liquid to be treated during a treatment period $t_d$, the time of residence $t_{res}$ required to obtain the requested treatment, the time of loading of the reactor $t_{inj}$, the height $h_s$ reached by the liquid by capillary action in the column, the surface S of the reactor and the ratio R of the mass of the absorbent bed saturated with the liquid to be treated to the mass of the same bed in dry form, said dry bed having an apparent density $d_{app}$, by using the following equations:

$$n_{inj} = \frac{t_d}{(t_{res} + t_{inj})} \quad (4)$$

in which $n_{inj}$, $t_d$, $t_{res}$ and $t_{inj}$ are defined as above;

$$V_r = D/n_{inj} \quad (5)$$

in which $V_r$, D and $n_{inj}$ are defined as above;

$$V = \frac{V_r \cdot d_1}{(R-1) \cdot d_{app}} \quad (6)$$

in which $d_1$ is the density of the liquid to be treated, V, $V_r$, R and $d_{app}$ are defined as above;

$$M = V \cdot d_{app} \quad (7)$$

in which M, V and $d_{app}$ are defined as above;

$$h_t = V/S \quad (9)$$

in which S, V and $h_t$ are defined as above;

$$n_s = \frac{h_t}{h_s} - 1 \quad (10)$$

in which $n_s$, $h_t$ and $h_s$ are defined as above and wherein the number $n_s$ is rounded to the immediate upper integer.

15. The method according to claim 14, further comprising introducing air through at least one other inlet in the upper portion of the chamber.

16. The method according to claim 1, wherein the liquid to be treated is injected in a number $n_{inj}$ of batches, the liquid contained within the chamber has a volume $V_r$, the absorbent bed has a volume V and a mass M, the reactor has a surface S and there are a number $n_s$ of separation members, and wherein said method further comprises selecting said $n_{inj}$, $V_r$, V, M, S and $n_s$ as a function of the volume D of liquid to be treated during a treatment period $t_d$, the time of residence $t_{res}$ required to obtain the requested treatment, the time of loading of the reactor $t_{inj}$, the height $h_s$ reached by the liquid by capillary action in the column, the height $h_t$ of the absorbent bed in the reactor and the ratio R of the mass of the absorbent bed saturated with the liquid to be treated to the mass of the same bed in dry form, said dry bed having an apparent density $d_{app}$, by using the following equations:

$$n_{inj} = \frac{t_d}{(t_{res} + t_{inj})} \quad (4)$$

in which $n_{inj}$, $t_d$, $t_{res}$ and $t_{inj}$ are defined as above;

$$V_r = D/n_{inj} \quad (5)$$

in which $V_r$, D and $n_{inj}$ are defined as above;

$$V = \frac{V_r \cdot d_1}{(R-1) \cdot d_{app}} \quad (6)$$

in which $d_1$ is the density of the liquid to be treated, V, $V_r$, R and $d_{app}$ are defined as above;

$$M = V \cdot d_{app} \quad (7)$$

in which M, V and $d_{app}$ are defined as above;

$$S = V/h_t \quad (8)$$

in which S, V and $h_t$ are defined as above;

$$n_s = \frac{h_t}{h_s} - 1 \quad (10)$$

in which $n_s$, $h_t$ and $h_s$ are defined as above and wherein the number $n_s$ is rounded to the immediate upper integer.

17. The method according to claim 16, further comprising introducing air through at least one other inlet in the upper portion of the chamber.

18. The method according to claim 1, wherein the liquid to be treated is injected in a number $n_{inj}$ of batches, the liquid contained within the chamber has a volume $V_r$, the absorbent bed has a volume V and a mass M, the absorbent bed in the reactor has a height $h_t$ and there are a number $n_s$ of separation members and wherein said method further comprises selecting said $n_{inj}$, $V_r$, V, M, $h_t$ and $n_s$ as a function of the volume D of liquid to be treated during a treatment period $t_d$, the time of residence $t_{res}$ required to obtain the requested treatment, the time of loading of the reactor $t_{inj}$, the height $h_s$ reached by the liquid by capillary action in the column, the surface S of the reactor and the ratio R of the mass of the absorbent bed saturated with the liquid to be treated to the mass of the same bed in dry form, said dry bed having an apparent density $d_{app}$, by using the following equations:

$$n_{inj} = \frac{t_d}{(t_{res} + t_{inj})} \quad (4)$$

in which $n_{inj}$, $t_d$, $t_{res}$ and $t_{inj}$ are defined as above;

$$V_r = D/n_{inj} \quad (5)$$

in which $V_r$, D and $n_{inj}$ are defined as above;

$$V = \frac{V_r \cdot d_1}{(R-1) \cdot d_{app}} \quad (6)$$

in which $d_1$ is the density of the liquid to be treated, V, $V_r$, R and $d_{app}$ are defined as above;

$$M = V \cdot d_{app} \quad (7)$$

in which M, V and $d_{app}$ are defined as above;

$$h_t = V/S \quad (9)$$

in which S, V and $h_t$ are defined as above;

$$n_s = \frac{h_t}{h_s} - 1 \quad (10)$$

in which $n_s$, $h_t$ and $h_s$ are defined as above and wherein the number $n_s$ is rounded to the immediate upper integer.

19. The method according to claim 18, further comprising introducing air through at least one other inlet in the upper portion of the chamber.

20. The method according to claim 1, further comprising introducing air through at least one other inlet in the upper portion of the chamber.

* * * * *